United States Patent [19]
Cocchi et al.

[11] Patent Number: 5,653,118
[45] Date of Patent: Aug. 5, 1997

[54] COMBINED MACHINE FOR THE DUAL PRODUCTION OF CRUSHED-ICE OR OF ICE-CREAM

[75] Inventors: Gino Cocchi; Giancarlo Pietra, both of Bologna, Italy

[73] Assignee: Ali S.p.A. - Carpigiani Group, Italy

[21] Appl. No.: 560,961

[22] Filed: Nov. 20, 1995

[30] Foreign Application Priority Data

Dec. 21, 1994 [IT] Italy .................. GE94A0142

[51] Int. Cl.⁶ .......................................... F25B 41/06
[52] U.S. Cl. .............................. 62/197; 62/342
[58] Field of Search ................. 62/197, 205, 320, 62/342

[56] References Cited

U.S. PATENT DOCUMENTS

| | | | |
|---|---|---|---|
| 2,323,408 | 7/1943 | Miller | 62/197 |
| 2,540,550 | 2/1951 | Schulz et al. | 62/197 |
| 2,675,683 | 4/1954 | McGrath et al. | 62/3 |
| 3,150,502 | 9/1964 | Tucker | 62/197 |
| 3,285,030 | 11/1966 | Coyne | 62/197 |
| 4,394,816 | 7/1983 | Voorhis | 62/205 |
| 4,448,597 | 5/1984 | Kuwabara et al. | 62/197 |
| 4,653,928 | 3/1987 | Bravo | 62/342 |
| 4,688,390 | 8/1987 | Sawyer | 62/197 |
| 5,024,066 | 6/1991 | Goavec | 62/342 |
| 5,158,506 | 10/1992 | Kusano et al. | 62/136 |

FOREIGN PATENT DOCUMENTS

| | | |
|---|---|---|
| 0205670 | 12/1986 | European Pat. Off. . |
| 0583909 | 8/1993 | European Pat. Off. . |
| 193504 | 11/1985 | Italy . |

OTHER PUBLICATIONS

Patent Abstracts of Japan, vol. 7, No. 1 (M-183), 6 Jan. 1983; & JP-A-57 160713 (Hitachi); 4 Oct. 1992 *abstract*.

*Primary Examiner*—William E. Tapolcai
*Attorney, Agent, or Firm*—Larson and Taylor

[57] ABSTRACT

A combined machine for the dual production of crushed ice or ice cream includes a processing cylinder provided with a stirrer means, a refrigerating circuit and a device for operating the stirrer. The refrigerating circuit includes an evaporator in heat exchange relation with the processing cylinder, a compressor, a condenser, a filter and a control system for controlling the expansion of the refrigerating fluid. The control system includes a thermostatic expansion valve and a capillary tube, inserted in parallel in the circuit, as well as a switch disposed in the flow circuits of the control system.

2 Claims, 1 Drawing Sheet

COMBINED MACHINE FOR THE DUAL PRODUCTION OF CRUSHED-ICE OR OF ICE-CREAM

FIELD OF THE INVENTION

The present invention relates to a combined machine for the dual production of crushed-ice Sicilian style or of ice-cream.

BACKGROUND OF THE INVENTION

The machines for the production of ice cream and those for the production of crushed-ice have different peculiar features, although having as a common concept the treatment, in a cooled environment, of a liquid alimentary mix to obtain a solid product. In fact, for the production of Sicilian style crushed-ice a slow freezing is required under relatively minimal intense stirring, at temperatures not excessively low, so as to obtain ice sufficiently large crystals. In the manufature of ice cream, on the contrary, rapid cooling, intense stirring and low temperatures are necessary, in order to obtain crystals which are as small as possible.

From the above it will be evident that it is a problem to furnish a single machine for both productions.

From the (Italian) Patent for Utility Model No. 193504 a combined machine is known for the manufacture of ice-cream and of crushed-ice in which two distinct motors are used for the operation of the stirrer, that is a motor at high speed, for the manufacture of the ice-cream, and a motor at low speed (a few rotations per minute) for the manufacture of the crushed-ice.

The duplication of the motors renders the machine rather complicated and costly.

It is further known from the Italian patent application No. 21216 A/88 to use refrigerating units operating with capillary tubes for the production of crushed-ice. In fact, the refrigerating units permit a kind of more mild refrigeration which is more suited for the production, compared with the more drastic condition employed for the production of ice-cream.

SUMMARY OF THE INVENTION

The scope of the invention is to provide a combined machine for the dual producion of ice cream or of crushed-ice which is of simple construction and and limited costs.

It is therefore the object of the present invention to provide a combined machine for the dual production of crushed-ice and ice-cream, comprising a processing cylinder provided with stirring means, a refrigerating circuit and means for the operation of said stirring means. The refrigerating circuit comprises an evaporator in heat exchange relation with the processing cylinder, a compressor, a condenser, a filter and means for controlling the expansion of the refrigerating fluid. The control means comprises a thermostatic expansion valve and a capillary tube, inserted in parallel in the circuit, as well as switching means disposed in the flow circuits of the control means.

Advantageously the switching means are two electrovalves.

BRIEF DESCRIPTION OF THE DRAWINGS

Further advantages and features will be evident from the following description of one embodiment of the present invention made, by way of non limiting example, with reference to the drawings, in which.

DESCRIPTION OF THE PREFERRED EMBODIMENT OF THE INVENTION

Figure 1:
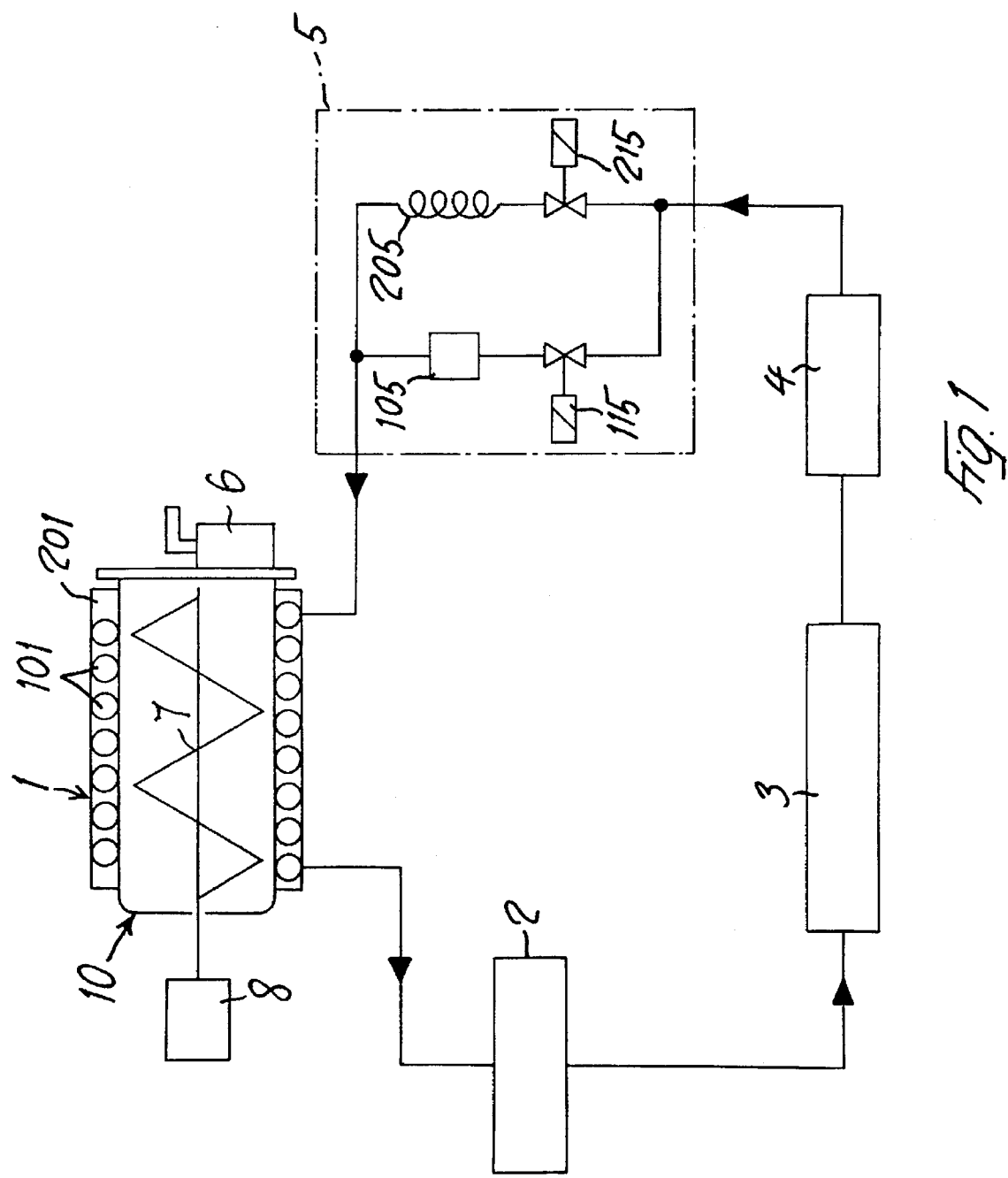
FIG. 1 is a diagrammatic representation of the refrigeration circuit of the combined machine according to the invention.

FIG. 1 shows the circuit diagram of the refrigerating circuit of the machine according to the invention. The circuit comprises: one evaporator 1, formed by a coil 101 wound around the processing cylinder 10 of the machine, which in turn is covered by a lining 201; a compressor 2, a condenser 3, a filter 4 and finally controlling means 5. The controlling means consists of two circuit branches disposed in parallel comprising on one branch an electrovalve 115 and a thermostatic expansion valve 105, and on the other branch another electrovalve 215 and a capillary tube 205. The circuit is thereafter again closed on the evaporator 1. The processing cylinder 10 is provided with a stirrer 7, operated by a motor 8, and is equipped at one end with a delivery cock 6 for the delivery of the finished product.

The operation of the machine according to the invention will be evident from the following. The refrigerating fluid, which in the evaporator 1 has charged itself with the heat subtracted from the content of the cylinder 10, is compressed in the compressor 2, cooled in the condenser 3 and subjected to the action of the filter 4. At this point, the subsequent admission in the evaporator is controlled according to the kind of production for which the machine was arranged. In fact, if the machine was arranged for the production of crushed-ice, in this case the electrovalve 115 which is disposed at the entrance of the branch of the circuit controlled by the expansion valve 105 will be closed, whilst the electrovalve 215 which is disposed on the branch controlled by the capillary tube 205 will be opened. As a consequence a more soft regulation of the refrigeration will be obtained, that is with less low temperatures and with longer refrigeration times, thus promoting the production of crushed-ice.

If on the contrary the production to be made is that of ice-cream, in view for the need of more drastic refrigeration conditions, which may not be ensured by the flow regulation made by the capillary tube, the branch controlled by the capillary tube 205 is excluded by closing the electrovalve 215. At the same time, the electrovalve 115 is opened, and in this manner the flow of refrigerating fluid is controlled through the thermostatic expansion valve 105, in a manner with is known per se.

The machine according to the invention, thanks to the refrigerating circuit above described with which same is provided, is therefore able to furnish the suitable processing conditions for the two productions which otherwise are difficult to be combined; the whole without excessive costs and with a comparative constructive easiness assuring in addition a good compactness to the machine.

We claim:

1. A combined machine for the dual production of crushed-ice and ice-cream, comprising a processing cylinder; a port in said cylinder for delivery of processed product; motor operated stirring means inside of said cylinder; and a refrigerating circuit, said refrigerating circuit comprising an evaporator in heat exchange relation with said processing cylinder, a compressor, a condenser, a filter and means for controlling the expansion of the refrigerating fluid, said control means comprising a thermostatic expansion valve and a capillary tube, inserted in parallel in the circuit, and switching means disposed in the flow circuits of said control means.

2. A combined machine according to claim 1 wherein said switching means comprises two electrovalves.

* * * * *